United States Patent
Peng et al.

(10) Patent No.: US 6,876,504 B2
(45) Date of Patent: Apr. 5, 2005

(54) APPARATUS FOR DETECTING INACCURACY OF MACHINING OF FINISHED WORKPIECE

(76) Inventors: Hsien lu Peng, No. 7, Lane 2, Jungjeng Rd., Sanyi Shiang, Miaoli County (TW); Hsin Fung Peng, No. 7, Lane 2, Jungjeng Rd., Sanyi Shiang, Miaoli County (TW)

(*) Notice: Subject to any disclaimer, the term of this patent is extended or adjusted under 35 U.S.C. 154(b) by 0 days.

(21) Appl. No.: 10/603,391

(22) Filed: Jun. 24, 2003

(65) Prior Publication Data

US 2004/0263992 A1 Dec. 30, 2004

(51) Int. Cl.$^7$ .............................. G02B 7/04
(52) U.S. Cl. ............ 359/819; 359/802; 356/399; 82/82
(58) Field of Search ............ 359/819, 802, 359/822; 356/153, 399, 400; 82/82

(56) References Cited

U.S. PATENT DOCUMENTS 4,215,937 A * 8/1980 Borsuk ............ 356/73.1
5,983,736 A * 11/1999 Gershman ............ 73/865.8

* cited by examiner

Primary Examiner—Scott J. Sugarman
Assistant Examiner—Darryl J. Collins
(74) Attorney, Agent, or Firm—Pro-Techtor International Services

(57) ABSTRACT

A lens apparatus for detecting inaccuracy of machining of a finished workpiece is disclosed. After finishing the workpiece on a machine table in a machining process, remove a tool from a shaft, mount the lens apparatus under the shaft, couple a display to the machine, machine a left side of the workpiece by moving the table to align the left side of the workpiece with a reference point of a lens for determining alignment of the workpiece, initialize data shown on the display if the workpiece has been aligned, adjust the table to align a right side of the workpiece with the reference point for determining the alignment of the workpiece, determine whether there is an inaccuracy of machining of the workpiece by watching updated data on the display, remove the lens apparatus, and replace the tool with a second tool for correcting the machining process if an inaccuracy occurs.

2 Claims, 6 Drawing Sheets

APPARATUS FOR DETECTING INACCURACY OF MACHINING OF FINISHED WORKPIECE

BACKGROUND OF THE INVENTION

1. Field of the Invention

The present invention relates to the detection of inaccuracy of machining and more particularly to an improved apparatus for directly detecting inaccuracy of machining of a finished workpiece on a table.

2. Description of Related Art

Conventionally, detection of inaccuracy of machining is required for a finished workpiece on, for example, a lathe in order to determine whether the inaccuracy of machining is within allowance. A correction is done if the inaccuracy of machining exceeds the allowance. However, typically, there is no detection means installed on a table of a machine on which the workpiece is being machined. As such, it is typical for an operator to remove the workpiece from the table to another place after machining. Next, the operator employs other devices for detecting any inaccuracy of machining. The same as above, a correction is done if the inaccuracy of machining exceeds the allowance. In view of the above, such procedure is time consuming and inefficient. Hence, a need for improvement exists.

SUMMARY OF THE INVENTION

It is an object of the present invention to provide a lens apparatus for detecting inaccuracy of machining of a finished workpiece, comprising a hollow body including a cylindrical downward extension having inner threads, an intermediate cubic passageway, a channel at one side of the passageway, four threaded holes at four sides of the passageway, an upper cubic cavity, and a shoulder interconnected the cavity and the passageway, the shoulder having four threaded holes at four corners; a hollow cylinder having an externally threaded section threadably secured to the inner threads of the body and a narrow, lower externally threaded portion projected downward from the extension of the body, the lower externally threaded portion having inner threads; a sleeve put on a lower part of the body and including inner threads threadably secured to the lower externally threaded section, the sleeve being rotatable to adjust the cylinder; a magnifying lens including an upper externally threaded section threadably secured to the inner threads of the lower externally threaded portion, a magnification of the magnifying lens being adjustable by rotating the sleeve; a hollow cubic support seated on the passageway, the support including four corner projections and four threaded holes through the projections so as to permit a plurality of adjustment screws to drive through the projections to urge against the support for fine adjustment; a square image processor seated on the projections so as to permit a plurality of bolts to drive through four corners of the image processor into the projections for fastening the image processor in the support, the image processor including a bottom lens and a top connector coupled to a cable of a monitor via the channel; and a cubic positioning member including four threaded holes at four corners for permitting a plurality of bolts to drive through and into the shoulder for securing the positioning member to the body, and a plurality of holes for permitting a plurality of fasteners to drive through for fastening a shaft of a machine, wherein a tool is removed from the shaft, the lens apparatus is mounted under the shaft, a display is coupled to the machine, a left side of the workpiece is machined by moving the table to align the left side of the workpiece with a reference point of the lens for determining whether the workpiece is aligned or not by watching the monitor, data shown on the display is initialized if the workpiece has been aligned, the table is adjusted to align a right side of the workpiece with the reference point for determining whether the workpiece is aligned or not by watching the monitor, it is determined whether there is an inaccuracy of machining of the workpiece or not by watching updated data on the display, the lens apparatus is removed, and the tool is replaced with a second tool for correcting the machining process if an inaccuracy occurs in response to finishing the workpiece on a table of the machine in a machining process. By utilizing the present invention, accuracy of machining of the finished workpiece is greatly improved.

In one aspect of the present invention, the image processor is a CCD (charge coupled device).

The above and other objects, features and advantages of the present invention will become apparent from the following detailed description taken with the accompanying drawings.

DETAILED DESCRIPTION OF THE PREFERRED EMBODIMENTS

Figure 1:
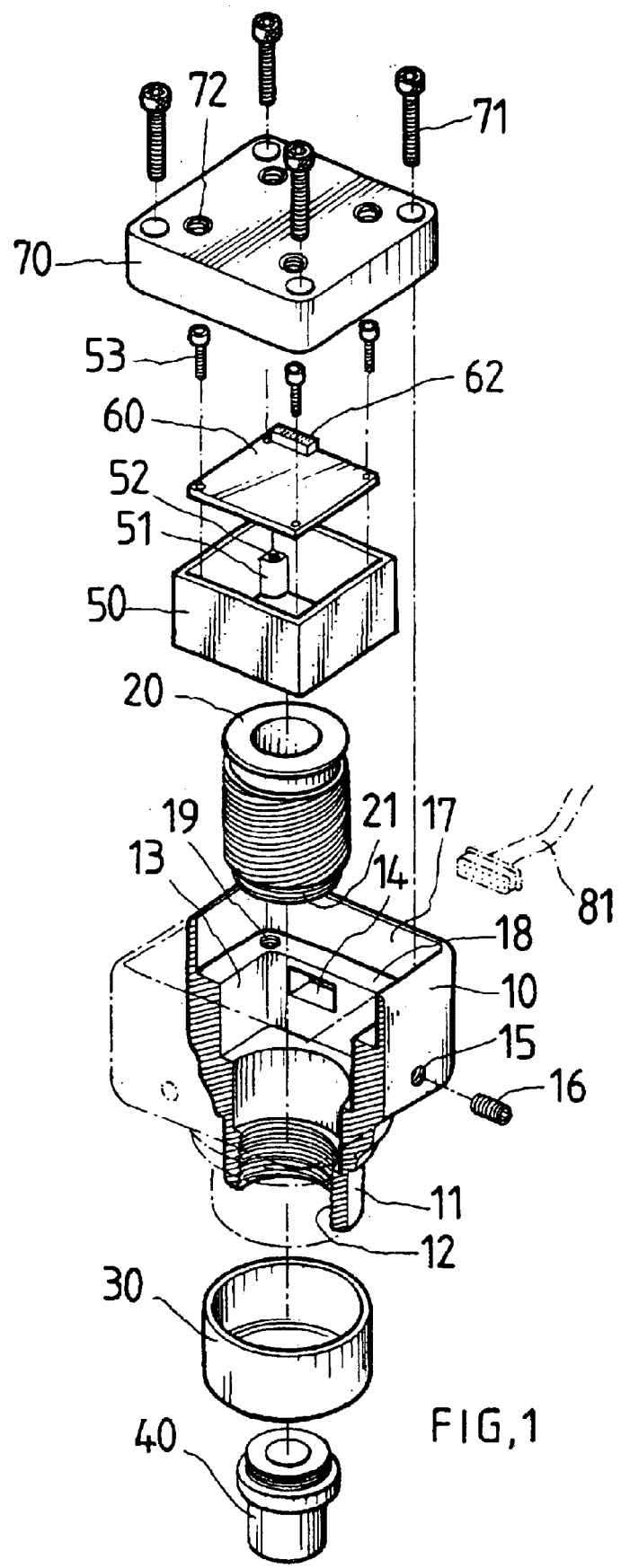
FIG. 1 is an exploded view of a preferred embodiment of apparatus for detecting inaccuracy of machining of a finished workpiece according to the invention.
Figure 2:
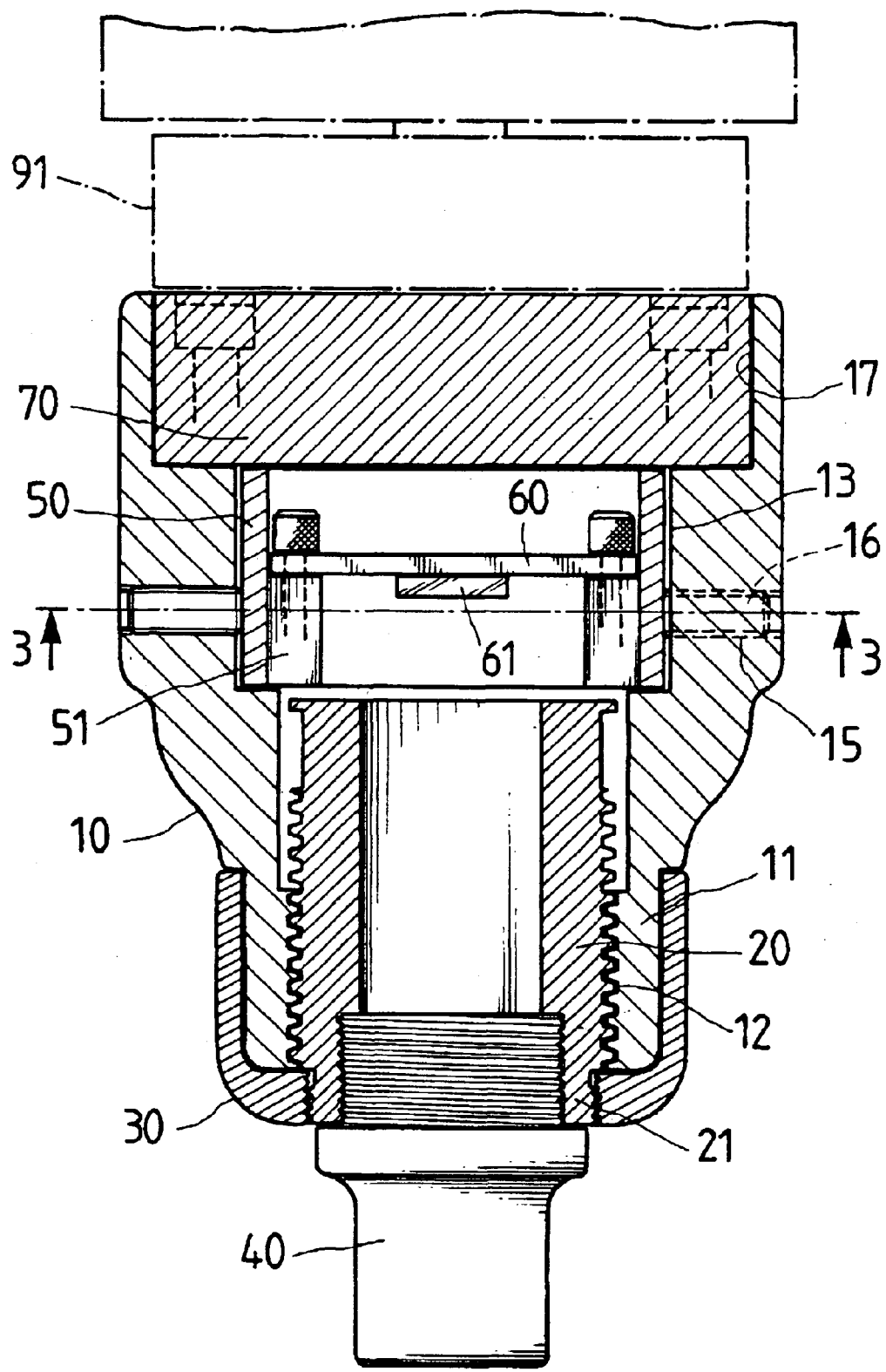
FIG. 2 is a cross-sectional view of the assembled apparatus with the shaft fastened therein.
Figure 3:
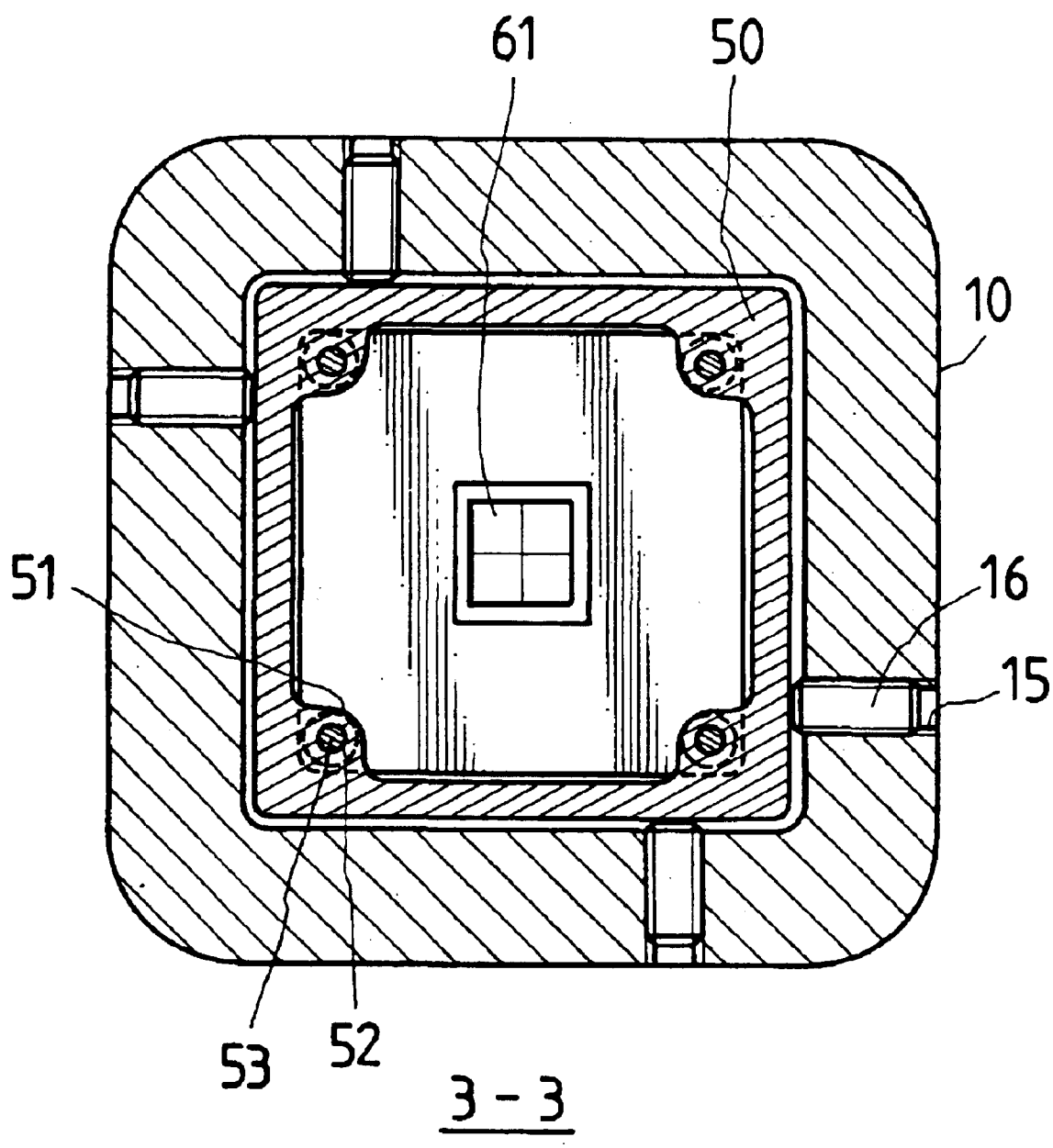
FIG. 3 is a cross-sectional view of the image processor, support, and body taken along line 3—3 of FIG. 2.
Figure 4:
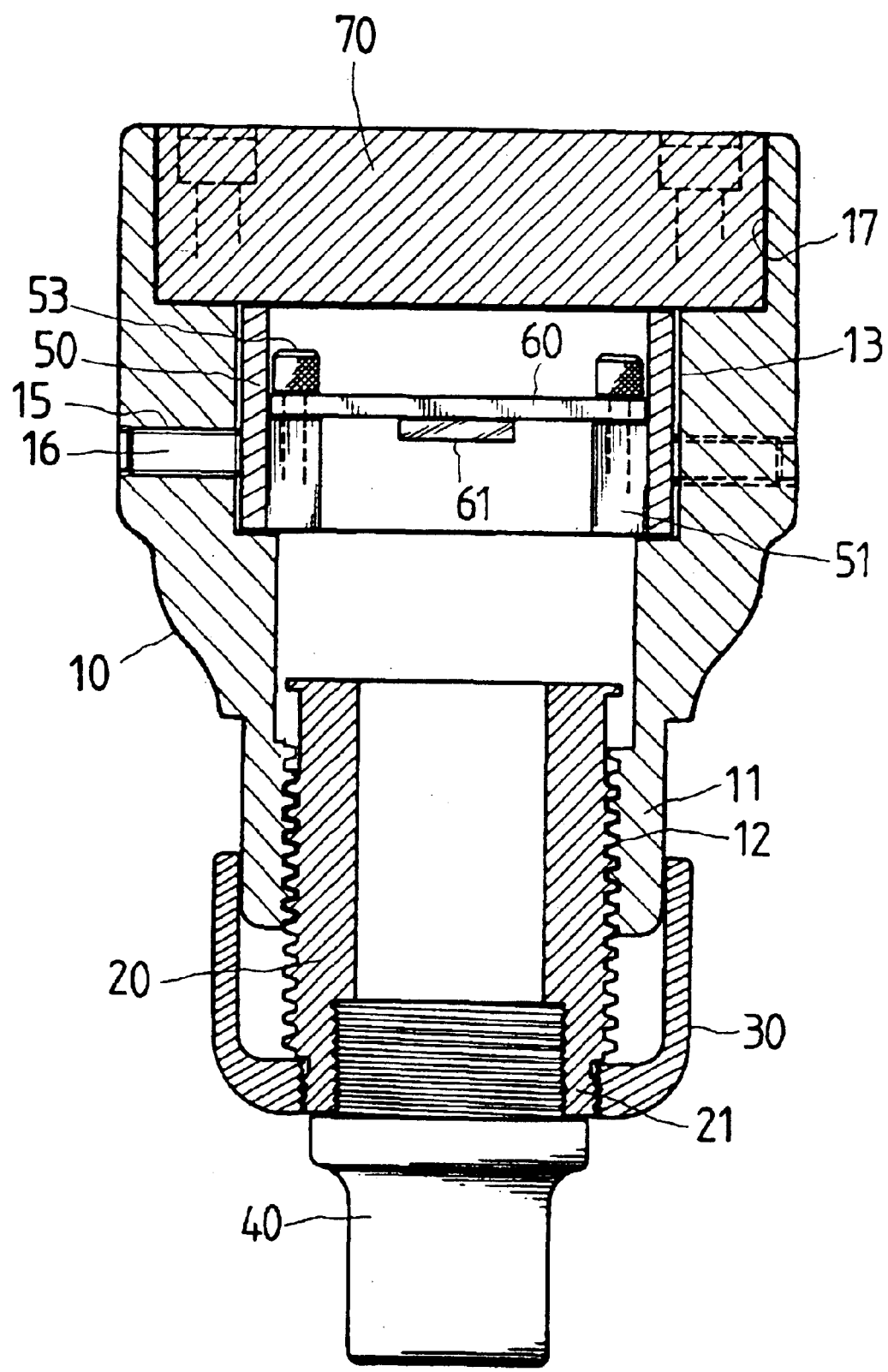
FIG. 4 is a view similar to FIG. 2 where the positioning member is fastened therein.

Referring to FIGS. 1 to 4, an apparatus for detecting inaccuracy of machining of, a finished workpiece constructed in accordance with the invention is illustrated. The apparatus is implemented as a detection lens assembly mounted on a shaft 91 of a machine (not shown). The detection lens assembly comprises a hollow body 10, a cylindrical downward extension 11 having inner threads 12, a hollow cylinder 20 having an externally threaded section threadably secured to the inner threads 12 and a narrow, lower externally threaded section 21 projected downward from the extension 11, a sleeve 30 put on a lower part of the body 10 and having inner threads threadably secured to the lower externally threaded section 21, and a magnifying lens 40 having an upper externally threaded section threadably secured to inner threads of the lower externally threaded section 21. As such, an operator can rotate the sleeve 30 to adjust the cylinder 20 and thus the magnification of the magnifying lens 40 while machining.

The body 10 comprises an intermediate cubic passageway 13, a channel 14 at one side of the passageway 13, and four threaded holes 15 at four sides of the passageway 13. The detection lens assembly further comprises a hollow cubic support 50 seated on the passageway 13, the support 50 including four projections 51 at four corners and four threaded holes 52 through the projections 51. A plurality of adjustment screws 16 are driven through the threaded holes 15 to urge against the support 50 for adjustment as detailed later. The detection lens assembly further comprises a square image processor 60 seated on the projections 51. Also, a plurality of bolts 53 are driven through four corners of the image processor 60 into the threaded holes 52 for fastening the image processor 60 in the support 50. The image processor 60 is implemented as a CCD (charge coupled device). The image processor 60 comprises a bottom lens 61 and a top connector 62. A cable 81 extended from a monitor (not shown) is inserted through the channel 14 to couple to the connector 61. Hence, an operator can adjust the adjustment screws 16 for fine adjustment of the support 50. Such fine adjustment is done in cooperation with a virtual reticle (see FIG. 3) on the lens 61 for finding a reference point of the lens 61.

The body 10 further comprises an upper cubic cavity 17 and a shoulder 18 interconnected the cavity 17 and the passageway 13. The shoulder 18 has four threaded holes 19 at four corners. A cubic positioning member 70 has four threaded holes at four corners for permitting a plurality of bolts 71 to drive through and into the threaded holes 19 for securing the positioning member 70 to the body 10. The positioning member 70 further comprises a plurality of holes 72 for permitting a plurality of fasteners to drive through for fastening the shaft 91 of the machine.

Figure 5:
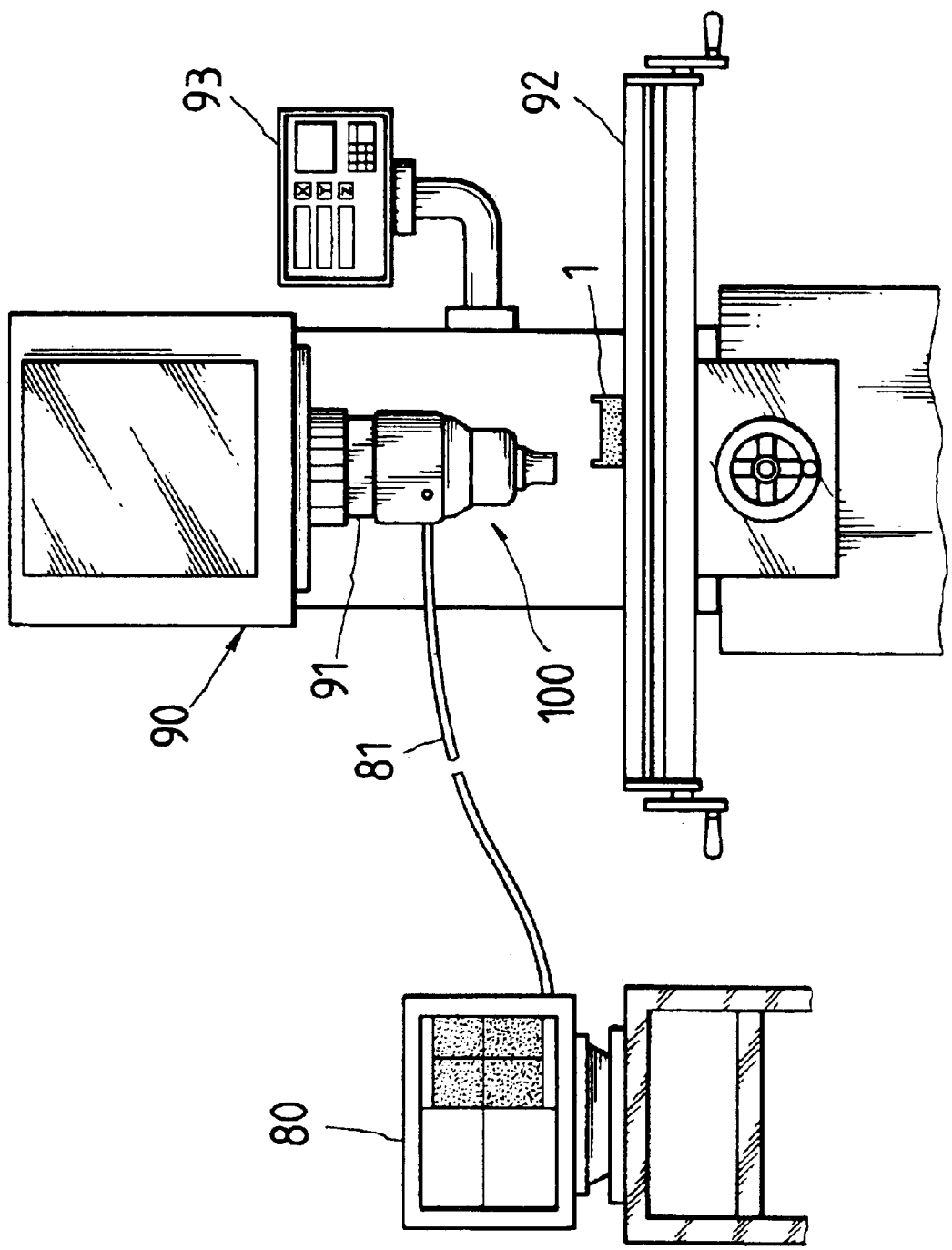
FIG. 5 is a front plan view illustrating an operating state of the detection apparatus during the process of machining.
Figure 6:
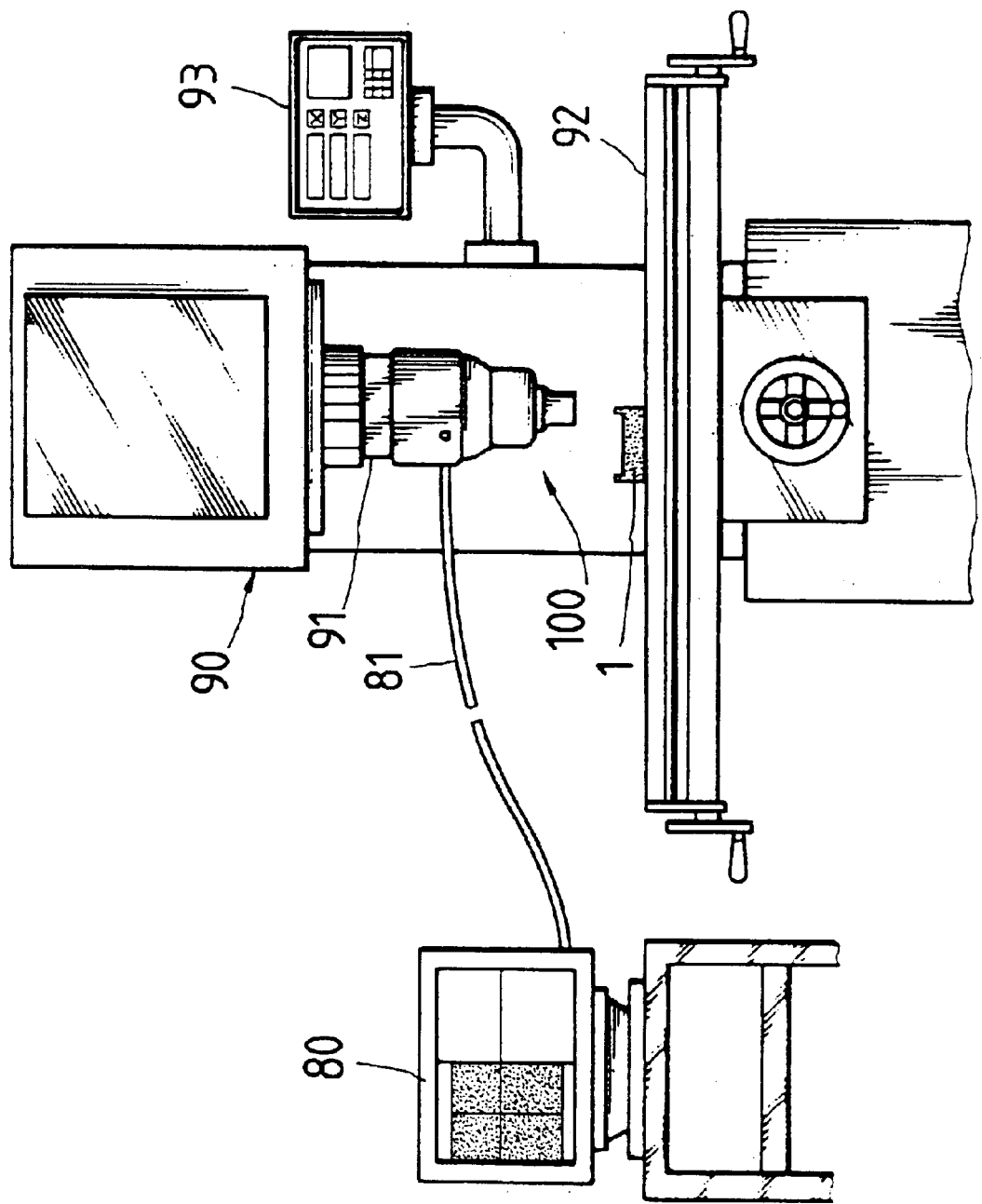
FIG. 6 is a view similar to FIG. 5 illustrating another operating state of the detection apparatus during the process of machining.

Referring to FIGS. 5 and 6 in conjunction with FIGS. 1 to 4, operations of the invention will now be described. The shaft 91 of a machine 90 is secured to the positioning member 70. A workpiece 1 is placed on a table 92 for machining. Instead of removing the workpiece 1 from the table 92, a tool (not shown) is removed from the shaft 91 after the workpiece 1 has been finished on the table 92. Next, mount the detection lens assembly 100 under the shaft 91. Next, couple the cable 81 to the monitor 80. This finishes the installation of the detection apparatus. A display 93 coupled to the machine 90 is adapted to show data of machining when the detection apparatus is detecting the accuracy of machining of the workpiece 1. In a case that the left side of the workpiece 1 is being machined first move the table 92 to align the left side of the workpiece 1 with the reference point of the detection lens assembly 100. The operator can watch the monitor 80 for determining whether the workpiece 1 is aligned or not. Next, initialize data shown on the display 93 if the workpiece 1 has been aligned. Thereafter, adjust the table 92 to align the right side of the workpiece 1 with the reference point of the detection lens assembly 100. Likewise, the operator can watch the monitor 80 for determining whether the workpiece 1 is aligned or not. The operator can watch updated data on the display 93 for determining whether there is an inaccuracy of machining or not as the detection process continues. The operation can remove the detection lens assembly 100 and replace a new tool for correcting the machining process if an inaccuracy occurs. In other words, the workpiece 1 is not removed from the machine 90 during the whole process of detection. As a result, the accuracy of machining of the finished workpiece 1 is greatly improved.

While the invention herein disclosed has been described by means of specific embodiments, numerous modifications and variations could be made thereto by those skilled in the art without departing from the scope and spirit of the invention set forth in the claims.

What is claimed is:

1. A lens apparatus for detecting inaccuracy of machining of a finished workpiece, comprising:

a hollow body including a cylindrical downward extension having inner threads, an intermediate cubic passageway, a channel at one side of the passageway, four threaded holes at four sides of the passageway, an upper cubic cavity, and a shoulder interconnected the cavity and the passageway, the shoulder having four threaded holes at four corners;

a hollow cylinder having an externally threaded section threadably secured to the inner threads of the body and a narrow, lower externally threaded portion projected downward from the extension of the body, the lower externally threaded portion having inner threads;

a sleeve put on a lower part of the body and including inner threads threadably secured to the lower externally threaded section, the sleeve being rotatable to adjust the cylinder;

a magnifying lens including an upper externally threaded section threadably secured to the inner threads of the lower externally threaded portion, a magnification of the magnifying lens being adjustable by rotating the sleeve;

a hollow cubic support seated on the passageway, the support including four corner projections and four threaded holes through the projections so as to permit a plurality of adjustment screws to drive through the projections to urge against the support for fine adjustment;

a square image processor seated on the projections so as to permit a plurality of bolts to drive through four corners of the image processor into the projections for fastening the image processor in the support, the image processor including a bottom lens and a top connector coupled to a cable of a monitor via the channel; and a cubic positioning member including four threaded holes at four corners for permitting a plurality of bolts to drive through and into the shoulder for securing the positioning member to the body, and a plurality of holes for permitting a plurality of fasteners to drive through for fastening a shaft of a machine, wherein a tool is removed from the shaft, the lens apparatus is mounted under the shaft, a display is coupled to the machine, a left side of the workpiece is machined by moving the table to align the left side of the workpiece with a reference point of the lens for determining whether the workpiece is aligned or not by watching the monitor, data shown on the display is initialized if the workpiece has been aligned, the table is adjusted to align a right side of the workpiece with the reference point for determining whether the workpiece is aligned or not by watching the monitor, it is determined whether there is an inaccuracy of machining of the workpiece or not by watching updated data on the display, the lens apparatus is removed, and the tool is replaced with a second tool for correcting the machining process if an inaccuracy occurs in response to finishing the workpiece on a table of the machine in a machining process.

2. The lens apparatus of claim 1, wherein the image processor is a CCD (charge coupled device).

* * * * *